E. C. WRIGHT.
DYNAMO ELECTRIC MACHINE WITH DISTRIBUTED BALANCING WINDING.
APPLICATION FILED JAN. 22, 1906.
932,084.
Patented Aug. 24, 1909.
2 SHEETS—SHEET 1.
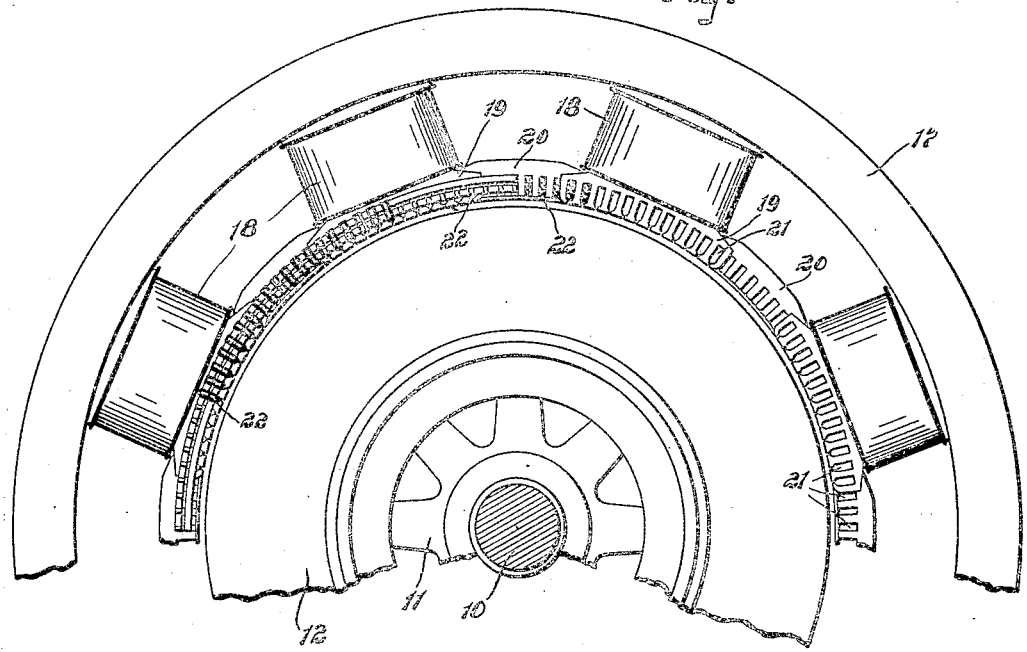
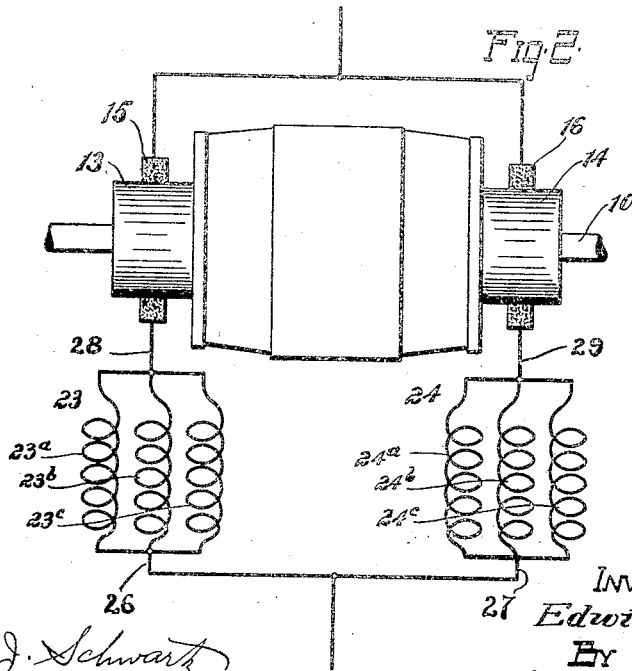
WITNESSES:
George J. Schwartz
Fred J. Kinsey
INVENTOR:
Edwin C. Wright.
BY
Chas. E. Lord
ATTORNEY.

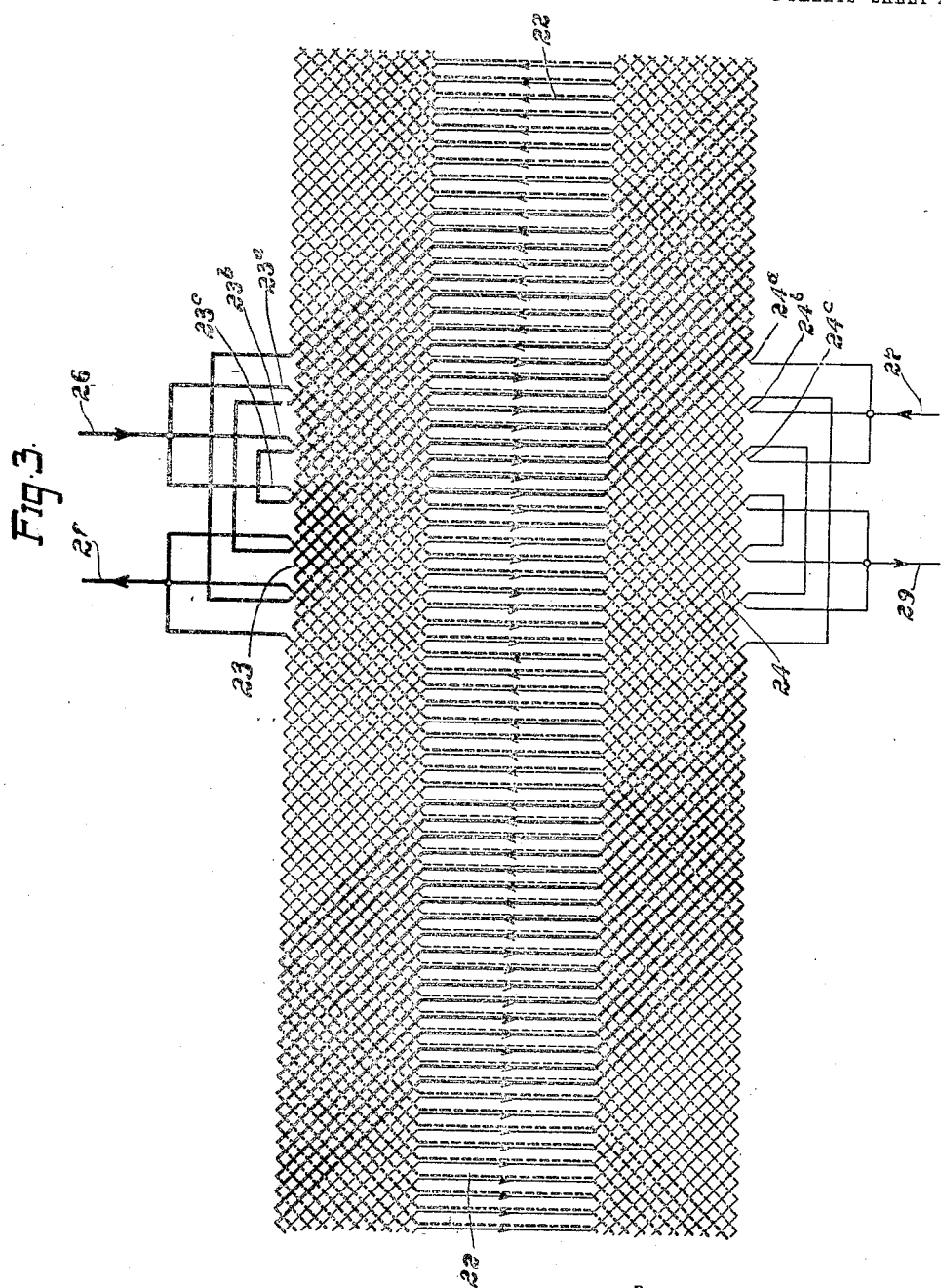

UNITED STATES PATENT OFFICE.

EDWIN C. WRIGHT, OF NEWPORT, KENTUCKY, ASSIGNOR TO THE BULLOCK ELECTRIC MANUFACTURING COMPANY, A CORPORATION OF OHIO.

DYNAMO-ELECTRIC MACHINE WITH DISTRIBUTED BALANCING-WINDING.

932,084.

Specification of Letters Patent. Patented Aug. 24, 1909.

Application filed January 22, 1906. Serial No. 297,138.

*To all whom it may concern:*

Be it known that I, EDWIN C. WRIGHT, citizen of the United States, residing at Newport, in the county of Campbell and State of Kentucky, have invented certain new and useful Improvements in Dynamo-Electric Machines with Distributed Balancing-Windings, of which the following is a full, clear, and exact specification.

My invention relates to dynamo-electric machines and especially to double commutator machines.

It is customary to provide direct and alternating current generators and motors with auxiliary field windings to reduce sparking at the brushes. The auxiliary winding is usually connected in series with the armature winding and is either arranged on auxiliary field poles intermediate the main field poles or is distributed in slots adjacent the armature, depending on the type of machine, its purpose and conditions of operation.

In machines designed for large currents considerable difficulty has been experienced with the auxiliary windings which, being in series with the armature, carry the same current, and hence require conductors of large size. If the coils of the auxiliary winding are arranged on auxiliary poles, the proper ampere-turns are obtained with very few turns of the auxiliary winding, frequently fractions of turns being required. If a distributed type of winding is employed, the slots in which the necessarily large conductors of the winding are supported must be deep and spaced far apart. The result is that the armature reaction is not fully balanced and the magnetic reluctance of portions of each field pole is altered by the large copper conductors and the flux is unevenly distributed.

In double commutator machines there is a tendency for the loads on the two commutators to become unbalanced resulting in the brushes of one commutator "grabbing" the load. Since the brushes of each commutator are intended to carry only one half of the load there is danger of the more heavily loaded brushes being destroyed. To lessen the danger of the loads becoming unbalanced, it has been proposed to insert in series with the brushes of each commutator an ohmic resistance. These resistances tend to maintain an equal division of current between the commutators, but cause a considerable waste of energy.

One of the objects of my invention is to provide for double commutator machines auxiliary windings which are so connected and arranged that the current carried by the conductors of said windings will be of less amount than the armature current whereby a larger number of comparatively small conductors can be employed.

A further object is to so connect the auxiliary windings to the brushes of the two commutators that the windings will themselves tend to maintain an equal division of current between the commutators.

With these ends in view I provide in double commutator machines a plurality of auxiliary field windings in parallel with each other and in series with the brushes on each commutator.

My invention consists still further in a double commutator dynamo-electric machine, having in series with brushes of each commutator a number of distributed balancing windings in parallel with each other, the conductors of said windings being arranged in slots equally distributed about the armature.

More specifically considered my invention consists in a double-commutator dynamo-electric machine, an armature, field poles having pole shoes connected by non-magnetic bridging members, the pole shoes and bridging members being provided with closely spaced equally distributed slots, and two sets of distributed balancing windings in said slots, said sets of windings being in series respectively with the two groups of commutator brushes, each set consisting of a number of similar windings connected in parallel.

My invention still further consists in certain novel combinations and arrangements of parts described in the specification and set forth in the appended claims.

Reference is had to the accompanying drawing in which—

Figure 1 is a sectional elevation of a dynamo-electric machine embodying the features of my invention, parts being omitted for the sake of clearness; Fig. 2 is a conventional representation of a double commutator machine, showing the arrangement and connections of the balancing windings; and Fig. 3 is a complete development of the auxiliary windings for four poles of the machine.

Referring to the figures of the drawing, 10 represents the shaft which supports the spider 11 and armature 12. The particular machine illustrated is a double-commutator machine, the two commutators being shown at 13 and 14, the sets or groups of brushes bearing thereon being represented at 15 and 16 respectively.

The field frame 17 has a number of inwardly projecting pole pieces the number of which can be varied without in any way affecting my invention. Each pole has a coil 18 of the main field winding and a pole shoe 19. The pole shoes are connected by non-magnetic bridging members 20, which may be held in place in any desired manner. The pole shoes and bridging members are provided with closely spaced, equally distributed slots 21. Located in these slots are the conductors 22 of the distributed balancing windings. In Fig. 1 part only of the conductors are shown in the slots. Of these conductors, part are shown in elevation and part in section. Instead of employing a single balancing winding carrying all the armature current or two balancing windings in series respectively with the brushes of the two commutators, I employ two sets or groups of balancing windings 23 and 24, each set or group consisting of a plurality of windings in parallel with each other and in series with the brushes of a commutator. In this case group 23 consists of three windings 23$^a$, 23$^b$ and 23$^c$ and group 24 of three windings 24$^a$, 24$^b$ and 24$^c$. The arrangement of the balancing winding is shown most clearly in Fig. 2.

Reference is had more particularly to Fig. 3 which shows a development of the windings for four poles of the machine, the windings of one set being shown in heavy lines and the windings of the other set in light lines. The same scheme of winding may be employed for any number of pairs of poles. It is seen that the groups or sets of windings enter from opposite sides of the machine at 26 and 27 and that each winding of each group is a wave winding which in this case passes six times around the armature, the windings emerging at 28 and 29. There are, therefore, six conductors per pole per winding or eighteen conductors per pole for each group or set of windings. It is seen from this figure that there are two conductors per slot and that each slot contains a conductor of each group of windings. Since the conductors of each group of windings are equally distributed around the armature, should the loads on the two commutators become slightly unbalanced, there will still be a uniform compensating balancing effect around the entire machine.

Since there are three windings for each group and since all the windings are in parallel, each winding normally carries one sixth the armature current. The result is that a large number of comparatively small conductors can be closely associated around the entire machine, which arrangement produces a more uniform and satisfactory compensating balancing effect than if a single winding consisting of a relatively small number of large conductors were employed. If the auxiliary windings are arranged on auxiliary poles intermediate the main poles, a large number of turns may be employed on each pole. Furthermore, by arranging one half of the windings in series with the brushes of one commutator and the other half in series with the brushes of the other commutator the distribution of current between the two commutators will tend to remain equal, on account of the ohmic drop due to each group of windings.

If the armature is provided with two windings, each connected to one of the commutators, the two groups of auxiliary field or balancing windings will reduce the tendency of unequal current distribution or will tend to maintain a definite or equal distribution of current between the two points of junction of the legs of the divided circuit, that is between the positive brushes of the two commutators respectively and between the negative brushes of the two commutators. If the armature has a single winding connected to both commutators, the two groups of auxiliary field windings will reduce the tendency of unequal current distribution or will tend to maintain the predetermined division of current between one point of junction of the legs of the divided circuit and the two commutators.

I do not wish to be confined to the exact details or arrangements and connections shown. The type of auxiliary winding may be varied, as may also the number of auxiliary windings. For example a greater or less number than three windings may be employed in each group or set. Also the number of conductors of each winding may be varied. I aim in my claims to cover all modifications which do not involve a departure from the spirit and scope of my invention.

What I claim as new and desire to secure by Letters Patent is:—

1. In a double commutator dynamo-electric machine having a main field winding, means tending to maintain a definite distribution of current between the two commutators, comprising two sets of auxiliary field windings, each set consisting of a number of windings in parallel relation, one set being connected in series with the brushes of one commutator and the other set being connected in series with the brushes of the other commutator.

2. In a double commutator dynamo-electric machine having a main field winding, means for reducing the tendency of unequal distribution of current between the two commutators, comprising two sets of auxiliary field windings, each set consisting of a number of windings in parallel relation and connected to the brushes of one of the commutators.

3. In a double commutator dynamo-electric machine having a main field winding, means for reducing the tendency of unequal distribution of current between the two commutators, comprising sets of distributed auxiliary field windings, each set consisting of a number of windings in parallel with one another and connected to the brushes of one of the commutators.

4. In a dynamo-electric machine, an armature having two commutators, a main field winding, and two sets of auxiliary field windings, each set comprising a number of windings in parallel with one another, one set being connected in series with the brushes of one commutator and the other set being connected in series with the brushes of the other commutator.

5. In a double commutator dynamo-electric machine, means for reducing the tendency of unequal division of current between the two commutators comprising groups of spark reducing windings, each group consisting of a number of windings in parallel with one another, one group being connected in series with the brushes of one commutator and the other group being connected in series with the brushes of the other commutator.

6. In a double commutator dynamo-electric machine having a main field winding, means for preventing sparking at the brushes and for reducing the tendency of unequal distribution of current between the commutators comprising a plurality of sets of auxiliary field windings, each set including a number of windings in parallel relation, one set being connected in series with the brushes of one commutator and the other set being connected in series with the brushes of the other commutator.

7. In a dynamo-electric machine, an armature provided with two commutators, brushes bearing on each commutator, a main field winding and a plurality of auxiliary balancing windings distributed about the armature, a portion of said auxiliary windings being in parallel relation and in series with the brushes of one commutator and the other auxiliary field windings being in parallel relation and in series with the brushes of the other commutator.

8. In a dynamo-electric machine, an armature provided with two commutators, brushes bearing on each commutator, a main field winding and a plurality of auxiliary field windings distributed about the armature and adjacent the conductors thereof, a number of said auxiliary windings being in series with the brushes on one commutator and in parallel with each other, and the other auxiliary windings being in series with the brushes of the other commutator and in parallel with each other.

9. In a dynamo-electric machine, an armature provided with two commutators, brushes bearing on each commutator, field poles, a main field winding, pole shoes on the field poles, bridging members between the pole shoes, said pole shoes and bridging members having equally spaced slots and a plurality of distributed auxiliary field windings or balancing windings in said slots, one half of said auxiliary windings being in series with the brushes on one commutator and in parallel with each other, and the other half of said windings being in series with the brushes of the other commutator and in parallel with each other.

10. In a dynamo-electric machine, an armature provided with two commutators, brushes bearing on each commutator, field poles having pole shoes, non-magnetic bridging members between the pole shoes, said pole shoes and bridging members having equally spaced slots, and a plurality of distributed auxiliary field windings located in said slots, said windings being in two sets each set consisting of a plurality of windings in parallel with each other the windings of one set being in series with the brushes of one commutator, and the windings of the other set being in series with the brushes of the other commutator, the conductors of the windings of both sets being located in the same slots.

11. In a dynamo-electric machine, an armature provided with two commutators, a field member having field poles provided with main field windings, and having a plurality of auxiliary field windings for reducing sparking at the brushes, a distributing circuit divided at the machine and connected to the brushes of each commutator, a portion of the auxiliary field windings including a number of windings in parallel relation being in the leg or portion of the divided circuit connected to the brushes of one commutator, and another portion of the auxiliary field windings including a number of windings in parallel relation being in the leg or portion of the divided circuit connected to the brushes of the other commutator.

In testimony whereof I affix my signature, in the presence of two witnesses.

EDWIN C. WRIGHT.

Witnesses:
ARTHUR F. KWIS,
FRED J. KINSEY.